(12) United States Patent
Levy (10) Patent No.: US 8,244,639 B2
(45) Date of Patent: Aug. 14, 2012

(54) CONTENT IDENTIFICATION, PERSONAL DOMAIN, COPYRIGHT NOTIFICATION, METADATA AND E-COMMERCE

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 1764 days.

(21) Appl. No.: 10/795,123

(22) Filed: Mar. 5, 2004

(65) Prior Publication Data
US 2004/0243634 A1   Dec. 2, 2004

Related U.S. Application Data

(60) Provisional application No. 60/452,620, filed on Mar. 5, 2003.

(51) Int. Cl.
*G06F 21/00* (2006.01)
(52) U.S. Cl. ............................. 705/51; 705/52
(58) Field of Classification Search ............ 705/51, 705/59, 52
See application file for complete search history.

(56) References Cited

U.S. PATENT DOCUMENTS

| | | | |
|---|---|---|---|
| 5,629,980 A | 5/1997 | Stefik et al. | |
| 5,943,422 A | 8/1999 | Van Wie et al. | |
| 6,122,403 A | 9/2000 | Rhoads | |
| 6,160,505 A | 12/2000 | Vaishampayan | |
| 6,185,683 B1 | 2/2001 | Ginter et al. | |
| 6,389,403 B1 * | 5/2002 | Dorak, Jr. ........................ | 705/52 |
| 6,442,285 B2 | 8/2002 | Rhoads et al. | |
| 6,449,367 B2 | 9/2002 | Van Wie et al. | |
| 6,505,160 B1 | 1/2003 | Levy et al. | |
| 6,522,769 B1 | 2/2003 | Rhoads et al. | |
| 6,553,129 B1 | 4/2003 | Rhoads | |
| 6,868,497 B1 | 3/2005 | Levy | |
| 7,103,663 B2 * | 9/2006 | Inoue et al. ................... | 709/225 |
| 7,124,304 B2 * | 10/2006 | Bel et al. ........................ | 713/193 |
| 7,363,278 B2 * | 4/2008 | Schmelzer et al. ............. | 705/67 |
| 2001/0031066 A1 * | 10/2001 | Meyer et al. .................. | 382/100 |
| 2001/0044899 A1 | 11/2001 | Levy | |
| 2002/0157002 A1 | 10/2002 | Messerges et al. | |
| 2002/0162118 A1 | 10/2002 | Levy et al. | |
| 2002/0174354 A1 * | 11/2002 | Bel et al. ........................ | 713/193 |
| 2002/0186844 A1 | 12/2002 | Levy et al. | |
| 2002/0188841 A1 | 12/2002 | Jones et al. | |
| 2003/0005135 A1 * | 1/2003 | Inoue et al. ................... | 709/229 |
| 2003/0037010 A1 * | 2/2003 | Schmelzer ..................... | 705/67 |

(Continued)

FOREIGN PATENT DOCUMENTS

WO    WO0161508    8/2001

(Continued)

OTHER PUBLICATIONS

U.S. Appl. No. 60/134,782, filed May 19, 1999, Rhoads.

(Continued)

*Primary Examiner* — Chrystina Zelaskiewicz
*Assistant Examiner* — Nancy Loan Le
(74) *Attorney, Agent, or Firm* — Digimarc Corporation (57) ABSTRACT

Piracy of digital content is currently a large problem. Copyright notification and sales of metadata can help counteract the problem. The novel solution shows different methods to provide copyright notification and sell metadata, such as including identification of the content (via digital watermarks, fingerprints, or header data) and a personal domain. Metadata is ideal to sell since it is dynamic, and, thus, is accessed from a master server.

27 Claims, 4 Drawing Sheets

U.S. PATENT DOCUMENTS

| | | | |
|---|---|---|---|
| 2003/0061165 A1* | 3/2003 | Okamoto et al. | 705/52 |
| 2003/0076955 A1* | 4/2003 | Alve et al. | 380/201 |
| 2004/0205028 A1* | 10/2004 | Verosub et al. | 705/59 |
| 2005/0018873 A1 | 1/2005 | Rhoads | |
| 2005/0091268 A1* | 4/2005 | Meyer et al. | 707/103 R |

FOREIGN PATENT DOCUMENTS

| | | |
|---|---|---|
| WO | WO02073378 | 9/2002 |
| WO | WO02082271 | 10/2002 |
| WO | WO02101524 | 12/2002 |

OTHER PUBLICATIONS

U.S. Appl. No. 09/404,291, filed Sep. 23, 1999, Levy.

U.S. Appl. No. 09/404,292, filed Sep. 23, 1999, Levy.

U.S. Appl. No. 09/636,102, filed Aug. 10, 2000, Ramos et al.

Linnartz et al., Philips Electronics Response to Call for Proposals, Issued by the Data Hiding SubGroup Copy Protection Technical Working Group, 1997, 31 pages.

Hunt, A New Extended Copy Control Information (ExCCI) Data Packet, http://www.cptwg.org/Assets/September%20presentations/ExCCI_CPTWG1.ppt, 17 pages.

U.S. Appl. 10/821,414, filed Dec. 20, 2005, Ammendment After Allowance.

Examination Report dated Mar. 22, 2012, for European Patent Application No. 04718023.7.

European search report dated Sep. 20, 2011, for European Patent Application No. 04718023.7.

Notice of Reasons for Rejection dated Feb. 2010, for JP Patent Application No. 2006-509157.

* cited by examiner

Fig. 2: Example

Fig. 3: Copyright Notification Enhancements

Fig. 4: Metadata e-Commerce

CONTENT IDENTIFICATION, PERSONAL DOMAIN, COPYRIGHT NOTIFICATION, METADATA AND E-COMMERCE

RELATED APPLICATION DATA

This patent application claims priority to U.S. patent application Ser. No. 60/452,620, filed Mar. 5, 2003, which is hereby incorporated by reference.

TECHNICAL FIELD

The invention relates to multimedia content identification, metadata management, rights management and digital distribution of multimedia content.

BACKGROUND AND SUMMARY

Piracy of digital content is a huge problem for the content (a.k.a. entertainment) industry. The solution must be a balance of content owner, consumer electronic, and information technology company interests, as well as provide the consumer easy-to-use content and benefits to switch from current CDs, DVDs, VHS, and free file sharing.

There are a number of proposed systems that seek to provide this balance. Some of these systems include the use of embedded data, and specifically, digital watermarks, to provide a number of functions, including copyright notice communication, persistent links to related metadata, rights management, and e-commerce opportunities, transaction tracking, and record and play control. Some examples are described in U.S. patent applications and patents: U.S. Ser. No. 60/134,782, U.S. Pat. Nos. 6,522,769, 6,442,285, 6,505,160, U.S. Ser. Nos. 09/636,102, 10/118,468 (published as U.S. 20020188841-A1), 10/126,921 (published as U.S. 20020186844), which are hereby incorporated by reference.

Content and personal domain identifiers are used to enable copyright notification and e-Commerce. In one embodiment, the system notifies the user of any content that is identified as a copyrighted work, and lets the user decide to continue or learn more and potentially purchase the content. In an enhanced embodiment, the system determines if the user has rights to play (or view) the content. If so, it plays the content. If not, there are options to purchase or play the content anyway. In an alternative embodiment, the content can be free, purchased or sampled, and the related metadata is purchased, if desired. It is easier to protect dynamic metadata, like concert dates, band info, etc., since it must be continually accessed from the content owner as the data is changing. Therefore, it is usually stored on a server. All embodiments can interact in various combinations, such as the system providing a copyright notification window, and then offering metadata for sale.

DETAILED DESCRIPTION

Content Identification

Multimedia content such as audio, video, images, e-books, and graphics can be identified via many methods, including digital watermarking, fingerprinting, and header data.

Digital watermarks are data embedded within the content. They are preferably robust to content transformation, including compression (e.g., MPEG), noise, and analog to digital conversion. The digital watermark can identify the content and/or the content owner, as well as carry copy control information, such as "no copy," "copy once," "copy no more," "copy freely," "no redistribution," "pause enabled" (as defined in the art; see, for example, the copy control states in the MPAA presentation on extended copy control information available at http://www.cptwg.org/Assets/September%20presentations/ExCCI_CPTWG1.ppt, which is incorporated by reference).

Another form of content identification is a content "fingerprint," which is a content representation derived from features of the content without requiring modification of the content (a.k.a. robust hash or content-based identification). Typically, the fingerprint is a vector of values computed from either a complete file or a portion of a content item. The fingerprint is not an auxiliary data carrier, and as such, cannot carry an auxiliary message such as copy control information. However, it can be matched with entries in a fingerprint database that have been derived from known content items. These entries can be associated with auxiliary information about the corresponding content items, such as copyright notification information, copyright control information, etc. To associate a function, behavior or metadata with a particular content item, a fingerprint-based system computes the fingerprint from a content item, attempts to match it to a corresponding fingerprint in a database, and gets the function, behavior or metadata associated with the best matching fingerprint in the database.

Header data can also identify content, and carry other auxiliary data, such as copy control information, etc. It is easy to associate with a content item, easy to read, and easy to remove, by accident or maliciously. Header data can be authenticated and locked to the content using digital signatures of all or part of the header data and/or all or part of the content as part of header data packet. The complete packet can be encrypted to limit viewing the header data, instead of or along with the authentication and locking the header data to the content. More details of locking the data is provided in U.S. patent application Ser. No. 09/404,291, which is hereby incorporated by reference.

Digital watermarks and fingerprints have the advantages that these technologies provide, and also provide a robust identification that is not accidentally removed, such as by conversion to analog format or lossy digital bit rate compression (e.g., MPEG audio or video compression), and that is hard to maliciously remove, such as when attacked by a pirate. Header data has the advantage of efficiency and it can survive compression using transmarking techniques as described in U.S. patent application Ser. Nos. 09/404,292 and 09/810,080 (published as Publication 2001-0044899-A1), which are hereby incorporated by reference. Watermarks are advantageous over fingerprints as they require a simpler database lookup since fingerprint methods require more computationally intensive classification schemes such as distance calculations to locate the matching database entry.

Personal Domain (PD)

The PD represents one or more devices of a group which has discrete boundaries by which the PD can be distinguished from other PDs, possibly via a statistically unique PD identifier (PD ID), or various device IDs representing a PD via a database linking devices, or devices inherently linked due to location. It may be limited to the devices in a home (e.g., some geographic location), to devices owned by a person, or to devices owned by a group of persons (such as family members). Devices may have different functionality, such as storage, rendering (a.k.a. consumption, playing, viewing), acquisition, redistribution, and processing.

One approach for assigning unique identifiers to represent a PD ID and device IDs is to issue IDs through a registration process that controls the issuance of IDs and maintains a registry of the IDs in a registration database. Another approach is to use pseudorandom number (PN) generation to create IDs that are statistically unlikely to be identical. PNs can be generated at the consumer's home to create IDs that serve as a PD ID or device ID, or, alternatively, at a manufacturing location to create a unique PD or device ID. Each manufacturer may register for a manufacturing ID that is part of the PD or device ID to increase statistical uniqueness.

The PD can be Identified by a Statistically Unique PD ID.

A single device ID may be equivalent to a corresponding PD ID.

A group of devices forming the PD can be assigned a separate PD ID, not equal to any device ID, or equal to the ID of a master or first device to create the PD. A group of device IDs can be registered in a database by the device owners to create the PD.

A group of devices can be linked to a PD via a statistically unique PD ID. The database can receive the PD ID from the first device and provide the PD ID to each subsequent device when registering, or the database can provide the PD ID to each registered device.

The PD ID can be linked to all devices via encryption. For example, the devices in a PD can communicate with each other and share the PD ID over a secure channel (e.g., a channel that employs encryption to protect the PD ID and digital signatures to authenticate the devices). When necessary, a device in a PD can request the PD ID from one or more other devices (e.g., from a master device in a group of devices in the PD), and receive the PD ID from another devices through a secure channel, or request that the other device forward it to a particular location.

Each device may also store its own copy of the PD ID in a secure memory location within the device (e.g., an encrypted memory). Portable devices store the PD ID locally, have a mechanism for requesting that another device in the PD forward the PD ID to a particular location on its behalf, or have a mechanism for requesting the PD ID from another device in the PD.

The PD ID can change each time a new device is added to a PD. For example, the PD ID may be re-computed as a hash of each device ID, as a function of a pseudorandom number generator, or derived in part from the device ID and pseudorandom number generator each time a new device is added.

Alternatively, the PD ID of the existing devices in a group can be propagated to each new device as devices are added. In one scheme, a first device in the PD uses its device ID as the PD ID, and this PD ID is moved forward from an existing device in the PD each time a new device is added.

The PD can be Identified with Several Device IDs (Also Labeled PD IDs).

A group of devices can be linked to a PD via a database, where the devices are linked in a group, to a person, to an address, etc., thus creating a PD. This database can be checked for device IDs belonging to multiple groups, persons, addresses, etc., and limit the number, such that a device can belong to one or two PDs. If this system does not assign a unique PD ID to the group of devices, the system has to be connected to the database that has linked all of the devices to the user to determine if the device is part of the proper PD. This system also allows one device to be registered to several people, such as members of a family with various PDs. For example, this can be beneficial if the parents or teenagers want an adult content domain. A device ID being registered to several PDs can also be stopped by checking the registration database for the device ID each time it is registered.

A group of devices behind a single firewall or router can correspond to a PD. In this case, any device that can communicate to another device without content crossing a firewall or router is part of a PD.

A PD can also be defined in terms of the physical or logical distance between the devices in the PD. One way to measure the distance is the allowed number of hops that an IP packet can travel from a given point (e.g., IP address). The number of hops can be measured based on data stored in the IP packet that indicates such information, or by sending test signals that measure the number of hops between devices in question. All of the devices within a given number of hops are considered part of a PD in this case.

A PD can also be defined as those devices that are physically connected to each other through a connection, such as a USB or Firewire connection.

As such, the PD ID may be a device ID, but represent a group of devices when the PD is inherently created by devices, such as those within a certain number of hops, behind one firewall and/or router, or linked in a database. In this case, one PD may have several PD IDs (since the PD can have several devices, each device has a different device ID, and the PD ID is each device ID). A database can be used to link all of the device IDs (i.e. PD IDs) together.

More about PDs

In order to control the behaviors associated with content using the PD ID, the system associates a PD ID with the content. This PD ID to content association can be implemented in a variety of ways depending on the content distribution model. One approach is to associate a PD ID with a particular subscription to a content distribution service. For example, when a user signs up for the service (web based service, wireless device service, interactive programming service, etc.) via a device used by that service (e.g., computer, cell phone, wireless PDA, set top box, etc.), the PD ID is established for the subscription and stored in the PD ID database maintained by the subscription service provider. All content sent to the user via the subscription is then associated with PD ID. One way to implement this association is to store the content ID of the content sent to the subscription with the PD ID in the PD ID database.

Another approach is to associate a PD ID with a content ID in a database whenever a user buys or licenses content identified with that content ID.

In implementations where the PD ID is allowed to change (e.g., for renewing the PD ID for security purposes, for adding new devices, etc.), the PD ID database is updated accordingly so that the most current PD ID is associated with the related content. Preferably, the PD ID database is mirrored and/or intelligently distributed over a number of servers.

Finally, the systems using a database require a trustworthy third party to maintain a database that links registered devices to licensed or purchased content, as well as to a PD ID, if desired.

Copyright Notification and e-Commerce

Figure 1:
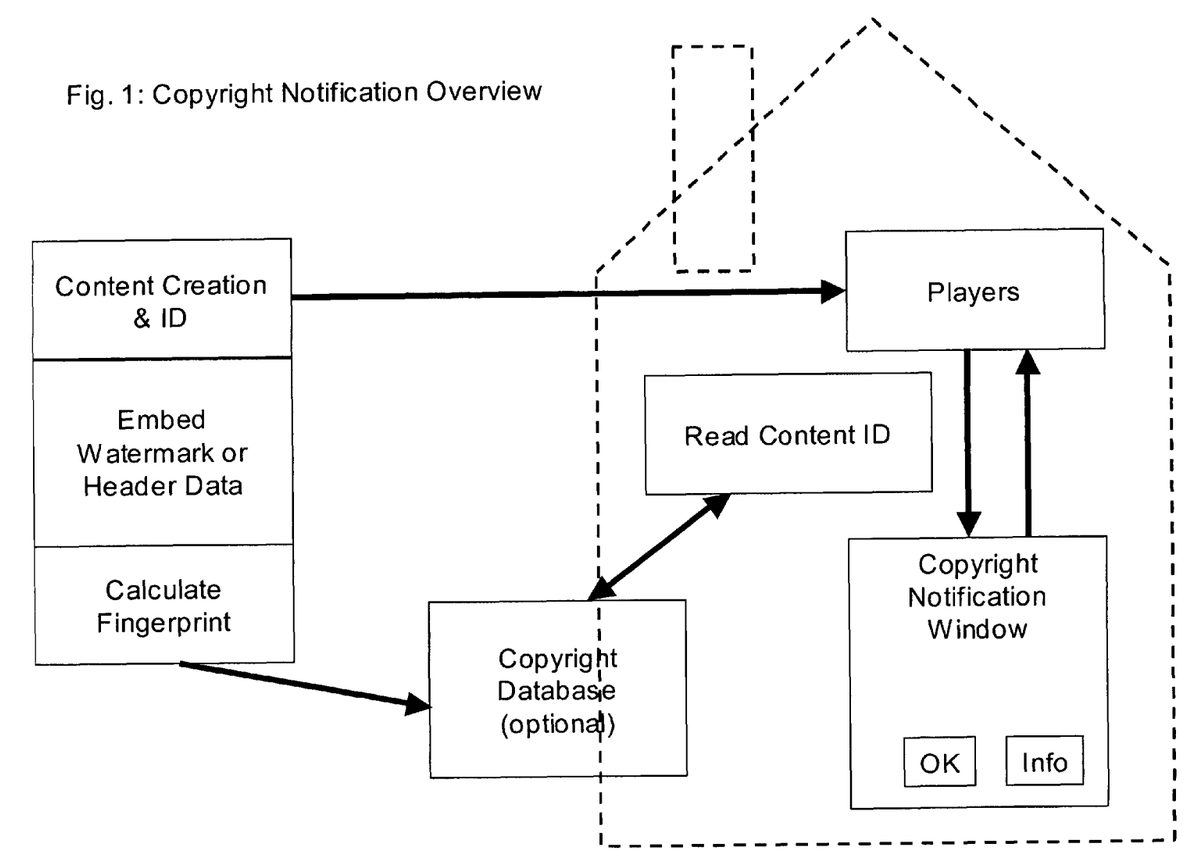
FIG. 1 is a diagram illustrating a system for copyright notification.

FIG. 1 shows an embodiment where the system provides a copyright notification when the copyrighted content is rendered. The copyrighted content can be inherently identified via a watermark or header data, or a content ID can be used to look up in a remote database whether or not the content is copyrighted.

The method includes the following steps::
1. Content is identified during creation process
   a. Optionally, content metadata, as more fully described below, can be added to a metadata database, probably controlled by the content owner (not shown in FIG. 1)
   b. Optionally, populate copyright database (shown)
2. Content enters a PD
   a. Optionally, populate local copyright database with content ID (not shown in FIG. 1)
3. Content is selected for playing, burning to a CD or DVD, transferring to a portable player or removable media, or other interaction
4. Content is checked for copyright watermark or header data, or content ID (via fingerprint, watermark, or header data) is read or calculated and checked against a copyright database.
   a. The mere presence of a copyright watermark or header data can inherently indicate that the work is copyrighted, and thus it is not necessary to extract a particular message or identifier.
   b. Alternatively, an identifier carried in the watermark or header data, or calculated from a fingerprint, can be used to index a database with copyright information (further details below).
5. If content is copyrighted, a copyright notification is automatically presented that the user clicks on to render content
   a. User can select more information and ultimately purchase content.
6. If content is not a copyrighted work, the system continues working as requested by the user More specifically, the copyright notification informs the user that the materials are copyrighted. The notification can be an audible reading, visible part of the content or copyright window as part of a computer program. The notification can be similar to the Warning shown at the beginning of purchased or rented VHS or DVD movies, or like software click-through licenses. A notification window can have two options. One is to continue, through a user selectable option expressing the user's consent, agreement or understanding of the rights and obligations associated with the content, such as in the case of a software click-through license. The other is a user selectable option to learn more, such as a button labeled, "More Info". As noted, the watermark, header or fingerprint may be used to index a database for more information about the content item. When learning about more information, the user is enabled to purchase the content in question (one may say the user only purchases rights to play the content, as opposed to purchase the content).

The presence of the watermark or header data can be used to determine if the content is a copyrighted work. In addition, for watermarks, header data and fingerprints, a content ID can be used to lookup in a copyright database whether or not the content is a copyrighted work. A local version of the copyright database can be within the personal domain and populated during step 2, such that this local version only contains information for content that has entered the PD. Alternatively, if the content ID is not present or the database does not exist in the PD, the user's device can link with a remote copyright database to request copyright (and potentially other metadata) information about the content ID in question. The copyright database can also be remotely located and accessible via a network such as the Internet, and intelligently distributed (as described in "Efficient Interactive TV" filed on Jan. 28, 2002 as application Ser. No. 10/060,049 and related provisional applications, which are hereby incorporated by reference).

In the case where a header is used, the header data is preferably authenticated. Encryption methods, including digital signature techniques, can be used to keep the header information secure and authenticate it. This authentication can include verifying that the header is from a valid source as well as verifying that the header has not been modified. A secure hash, such as MD5 or SHA can be used to indicate whether the header has been modified by computing the hash of the header and comparing it with a previously computed hash stored separately (e.g., in a database or elsewhere in the content (e.g., in another header or in a watermark embedded in the content). The header can also be locked to the content by computing the header data as a function of a content ID and some values of the content itself (as described above).

Figure 2:
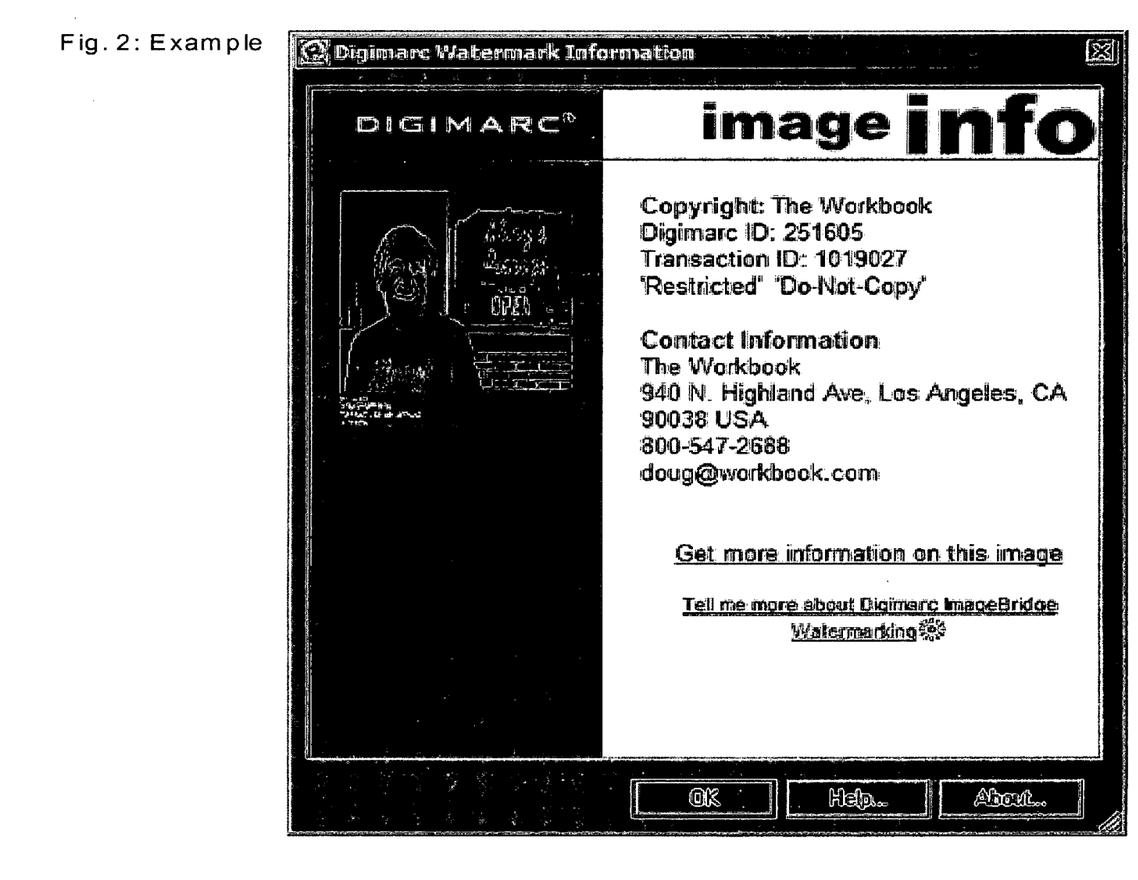
FIG. 2 is an example of a user interface display for copyright notification.

FIG. 2 shows an example of a copyright notification window in the Digimarc ImageBridge system from Digimarc Corp. This copyright notification window is brought up by the presence of an ImageBridge watermark. The metadata inside the copyright notification window comes from the content ID of the watermark and metadata databases, as described in patents and patent applications: U.S. Pat. No. 6,122,403 and U.S. Ser. No. 09/636,102, which are hereby incorporated by reference.

Figure 3:
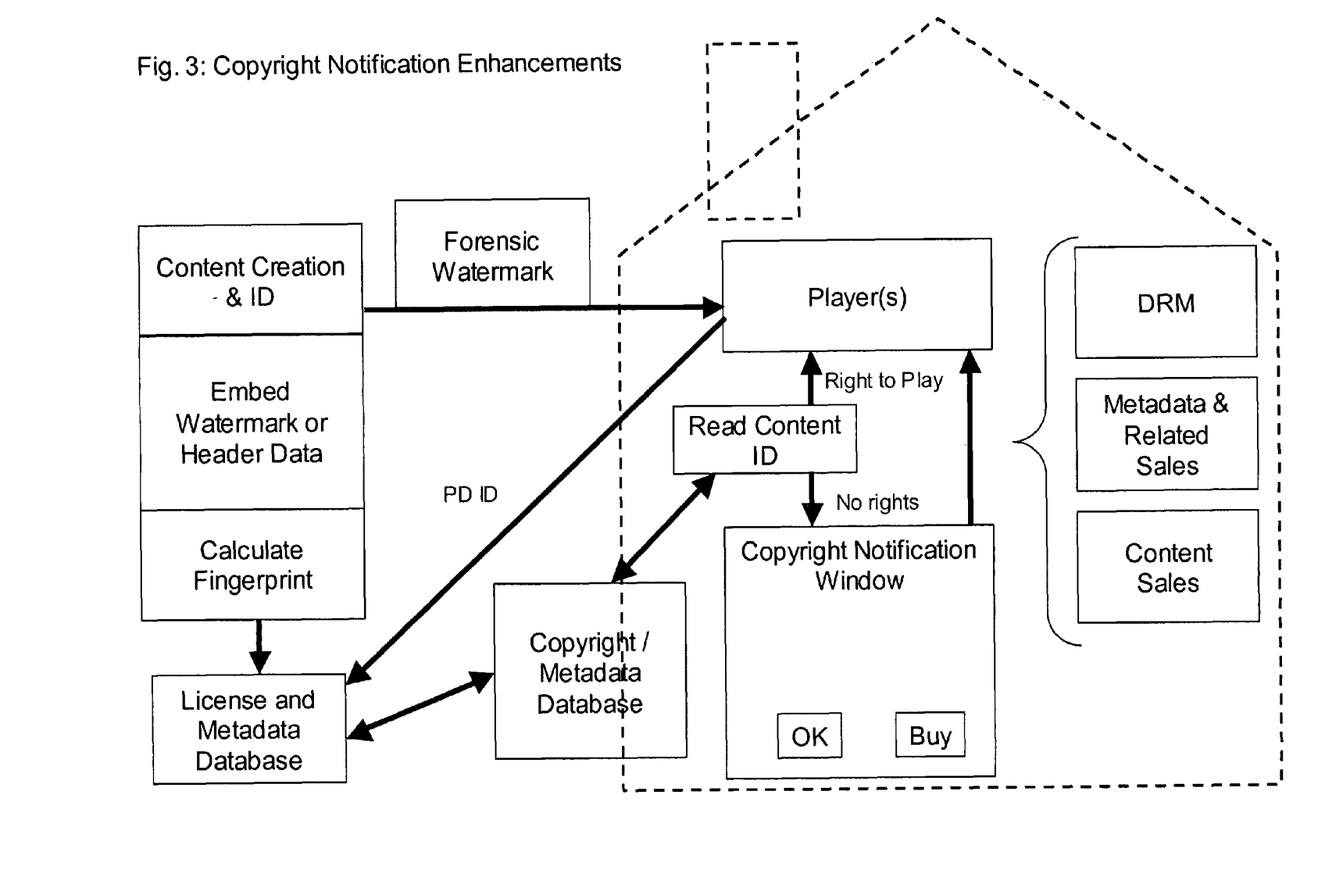
FIG. 3 is a diagram illustrating a system that extends copyright notification to include options to play, purchase or get more information about content.

FIG. 3 shows an enhanced embodiment, where the system identifies the content and PD, and determines whether or not the device has the right to render the content. If the user does not have rights and the content is copyrighted, the system provides copyright notification. If the user does have rights, the content is rendered.

More specifically, this enhanced embodiment involves the following steps:
1. Content is identified during creation process
   a. Optionally, content metadata, as described below, can be added to a master metadata database, probably controlled by the content owner
   b. The content ID is added to master copyright database to show that the content is copyrighted
2. Content enters a PD
   a. If purchased (via any business model—more below), PD ID and content ID are registered in master license database
   b. Optionally, populate local license, copyright and/or metadata database(s) with content ID, PD ID, and/or metadata
3. Content is selected for playing, burning to a CD or DVD, transferring to a portable player or removable media, or other legitimate action
4. Before content is acted upon (i.e. played, viewed, burned, transferred, etc.) on a device, the content ID is determined, and the PD ID (which may just be the device ID) and content ID are sent to a remote database to determine if the content item is authorized to be rendered on this device (see previous discussion of checking a database for authorization to render content).
5. If the user has rights to play content (e.g., owns the content, has a license, or has a valid subscription for this content), then the content plays (or any other legitimate action, such as burning or transferring, with the content is allowed)
6. If the user does not have rights to the content and the content is copyrighted (as determined from the content ID and copyright database or inherently from a copyright watermark or header data), the system provides a copyright notification window which states that content is protected and user does not have rights to play, with options such as     a. Play anyway     b. Purchase     c. More information (e.g., identifying what rights the user has in the personal domain, and what rights, content, and/or metadata can be purchased for that personal domain)

When content is purchased, such as but not limited to subscription services and pay per download or view business models, it is linked to the PD via the PD ID (remembering that the PD ID may be any one of the device IDs of the group of devices creating the PD—more details in PD section above). This content may have been purchased by any of the legitimate users of the PD, such as any member of the family. As such, a PD may be linked to several people and credit cards. State of the art privacy is well known and should be employed. Forensic watermarking with any of this information is a nice additional step when or after the content enters the PD.

The copyright database contains content IDs for copyrighted works. The license database contains PD IDs linked to content IDs that are purchased (a.k.a. licensed) for that PD ID, and many database structures can provide this information. During purchase or throughout the life of content, one or more PD IDs may be linked to the content based upon the structure of defining and identifying the PD.

The metadata database contains metadata linked to content IDs. These databases can be separate or contained in one complete database structure.

Either copyright notice embodiment can provide the user options when the content is rendered, or when content is moved to a portable device or media, such as transferred to an MP3 player or CD-R. Especially when moving a group of content or creating a play list, it may be optimal to have one copyright notification window that lists all of the content, such as songs, that are not licensed within the personal domain ID, or identified as copyright material (for the alternative embodiment).

e-Commerce of Metadata

Figure 4:
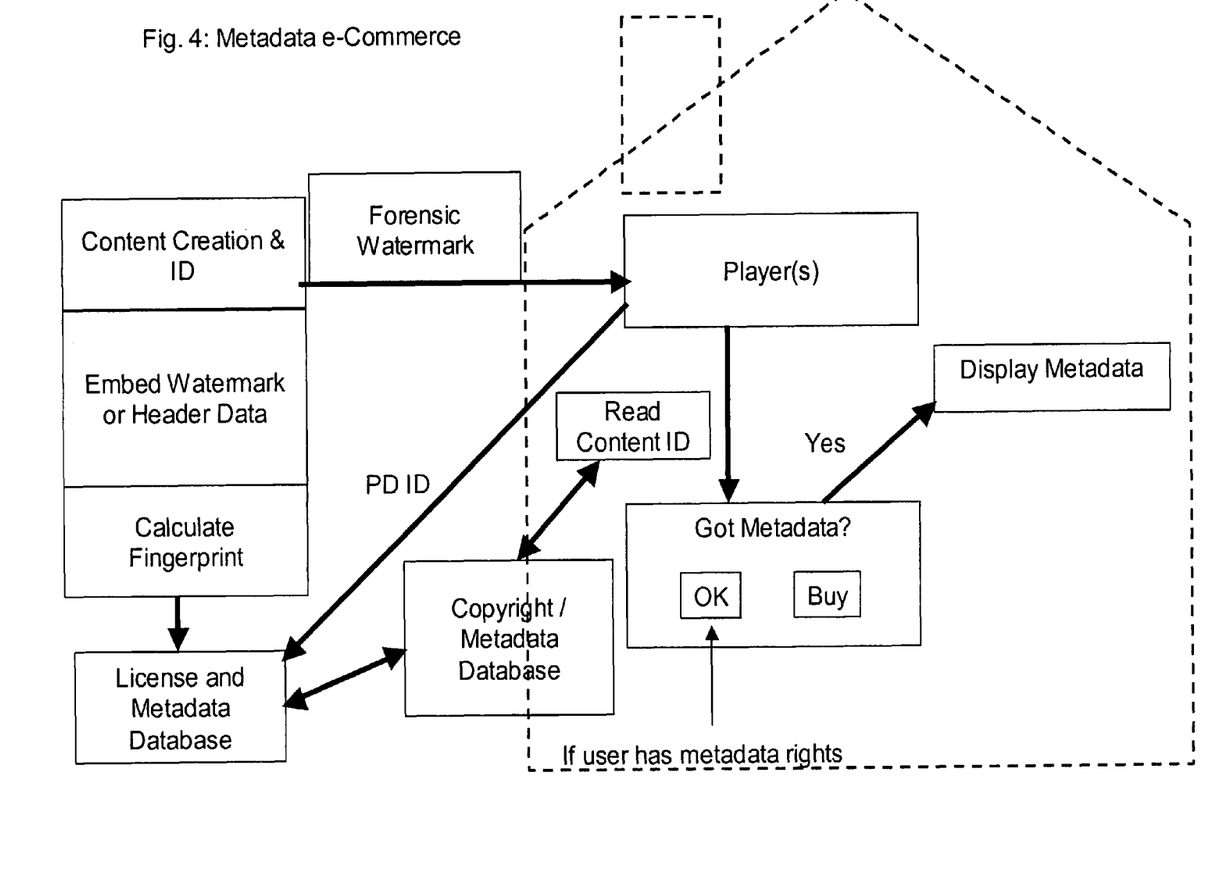
FIG. 4 is a diagram illustrating a system enabling metadata e-commerce.

FIG. 4 shows a system where the system identifies the content and PD, and provides metadata if previously purchased, or offers the metadata for sale.

The method includes the following steps:

1. Content is identified during creation process a. Metadata is added to a master metadata database, which is typically controlled by the content owner or third party metadata service provider 2. Content enters a PD     a. If purchased (via any business model—as described above), PD ID and content ID are registered in master license database     b. Optionally, license and/or metadata information is added to a local license and/or metadata database(s), which may be located in the PD or close to the PD 3. Content is played (or otherwise legitimately acted upon)

a. Content may have been purchased b. Content may be enabled to sample, such as "play anyway" scenario described above.

c. Content may be free, such as the case of lower quality versions of the digital content 4. Links to metadata are provided 5. If metadata links are selected by the user, metadata is displayed or purchased and displayed     a. May use subscription where all metadata is available for monthly charge     b. May charge micro-payments for each metadata, or premium metadata services, possibly on top of subscription service The license database contains PD IDs linked to content IDs where metadata is purchased for that PD ID, and many database structures can provide this information. During purchase or throughout the life of content, one or more PD IDs may be linked to the content based upon the structure of defining and identifying the PD. The metadata database contains metadata linked to content IDs. These databases can be separate or contained in one complete database structure.

Metadata and purchasing metadata or content is provided by metadata database and e-commerce engine. The metadata database may be centrally located and mirrored, or intelligently distributed (as included by reference above). The metadata database and e-commerce engine may be one server or different servers, even at different locations. The system uses secure transactions for transferring the metadata content (e.g., through downloading, streaming or broadcasting) to the user's device. These secure transactions can include, for example, sending encrypted metadata to the user over a secure communication channel (e.g., encrypted and authenticated).

FIG. 4 shows the metadata database intelligently distributed, where each content owner has their own content metadata database and the user has a copyright and content metadata database storing only information on the content that the user owns. User's metadata database can have metadata from different content owners databases—in other words, each content owner or metadata service provider can have their own database.

A preferred implementation is that content is free and metadata is purchased. Metadata can include, but is not limited to the following, song information, artist information, lyrics, concert dates, related songs, related items to purchase such as t-shirts, hats, etc., recent news, and recent location information on artist sightings.

Since most of this metadata is dynamic, it must be received from a metadata server. This increases the security of the system since sharing of metadata is only interesting for a short period of time, after which, users must go back to the metadata server for updated information, such as new concert locations and artist sightings.

By grouping devices together into a PD, all of the devices within the PD share metadata and share rights to access metadata that have been acquired by a user of the PD. There are number of alternative methods for sharing metadata across devices in the personal domain. One way is to associate rights to access the metadata with a PD in a database that tracks metadata access rights for each PD. When a user seeks to obtain the metadata for the content, that user can do so from any device in the PD by retrieving the metadata from a metadata database. In retrieval process, the system checks the metadata access rights in the database to determine whether the requesting device is in a PD that has rights to access the metadata in response to a request for that metadata from the requesting device. If so, the request is forwarded to a metadata server, which provides the metadata to the requesting device.

Another way to share metadata within a PD is to transfer access rights with the metadata that associate the metadata with the PD. The system uses these access rights to determine whether a user may move or copy the metadata to different devices within a PD.

Another way to share metadata within the PD is to associate it with a content object that it pertains to. This approach enables the user to move the content along with the metadata to other devices in the personal domain just by moving the content. This particular approach is particularly well suited for moving and/or copying content files with metadata to portable devices and/or removable memory devices that plug into devices in the PD. Restrictions on moving or copying the content outside the PD can also apply to the associated metadata or metadata access rights can be managed separately.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the data encoding processes may be implemented in a programmable computer or a special purpose digital circuit. Similarly, data decoding and fingerprint computations may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

The invention claimed is:

1. A method of managing media content comprising:
   receiving the media content in a personal domain;
   extracting a content identifier from the content;
   sending a personal domain identifier of the personal domain and the content identifier to a database;
   determining, by a programmed computer, from the database whether the personal domain has rights to play the media content based on the content identifier, the personal domain identifier and rights associated with the content identifier and personal domain identifier; wherein the personal domain identifier represents a group of devices for which a common set of rights for the content is associated through the content identifier; and
   presenting a copyright notice depending on whether the personal domain has rights to play the media content.

2. The method of claim 1 wherein the personal domain identifier corresponds to a group of device identifiers of devices in the personal domain.

3. The method of claim 1 including presenting one or more user selectable options with the copyright notice, the one or more options including an option to purchase the media content.

4. The method of claim 1 including presenting one or more user selectable options with the copyright notice, the one or more options including an option to play the media content in a case where the personal domain does not have the rights to play the media content.

5. The method of claim 1 including presenting one or more user selectable options with the copyright notice, the one or more options including an option to obtain more information about the media content.

6. The method of claim 1 wherein the database is within a consumer's network that includes the group of devices identified by the personal domain identifier.

7. The method of claim 6 wherein the database is updated when content is delivered to the personal domain.

8. The method of claim 6 wherein the database is updated when content playing is requested in the personal domain.

9. The method of claim 1 wherein the database is located on a remote network from the personal domain; the remote network comprising a network of interconnected computing devices.

10. The method of claim 9 wherein information in the database is distributed on the computing devices of the remote network based on usage.

11. The method of claim 1 wherein the personal domain identifier comprises a single identifier that is associated with two or more different device identifiers of devices in a personal domain.

12. The method of claim 1 wherein the personal domain identifier comprises a device identifier, and wherein a database is used to associate two or more different device identifiers of different devices with a single personal domain including the different devices.

13. The method of claim 1 wherein the personal domain identifier is defined based on a physical connection or distance between different devices in a personal domain.

14. A method for distributing metadata associated with media content, the method comprising:
   receiving the media content in a personal domain;
   extracting a content identifier from the content;
   sending a personal domain identifier of the personal domain and the content
   determining, by a programmed computer, from the database whether the personal domain has rights to access metadata about the media content based on the personal domain identifier; wherein the personal domain identifier represents a group of devices for which a common set of rights for the content is associated through the content identifier; and
   presenting a user selectable option for accessing metadata depending on whether the personal domain has rights to access metadata.

15. The method of claim 14 wherein the personal domain identifier corresponds to a group of device identifiers of devices in the personal domain.

16. The method of claim 14 wherein the database is within a consumer's network that includes the group of devices identified by the personal domain identifier.

17. The method of claim 16 wherein the database is updated when content is delivered to the personal domain.

18. The method of claim 16 wherein the database is updated when content playing is requested in the personal domain.

19. The method of claim 14 wherein the database is located on a remote network from the personal domain; the remote network comprising a network of interconnected computing devices.

20. The method of claim 19 wherein information in the database is distributed on the computing devices of the remote network based on usage.

21. The method of claim 14 wherein the personal domain identifier comprises a single identifier that is associated with two or more different device identifiers of devices in a personal domain.

22. The method of claim 14 wherein the personal domain identifier comprises a device identifier, and wherein a database is used to associate two or more different device identifiers of different devices with a single personal domain including the different devices.

23. The method of claim 14 wherein the personal domain identifier is defined based on a physical connection or distance between different devices in a personal domain.

24. A method of distributing metadata associated with media content, the method comprising:

maintaining a personal domain identifier for different devices in a personal domain;

maintaining content identifiers to identify media content and associate metadata with media content items;

using, by one or more programmed computers, the personal domain identifier and the content identifiers to determine access rights of a device in the personal domain to the metadata associated with the media content items; and sharing of metadata for a content item with devices in the personal domain when the personal domain has rights to access the metadata for the content item as determined from the access rights.

25. The method of claim 24 wherein rights to access the metadata for the content item are tracked in a metadata rights database, and checking the metadata rights database in response to a request from a device within a personal domain to determine whether the personal domain has rights to access the metadata for the content item.

26. The method of claim 24 including providing metadata access rights with metadata for the content item to control transfer of the metadata among devices in the personal domain.

27. The method of claim 24 including associating metadata with the content item so that the content item and the metadata can be shared among devices in the personal domain.

* * * * *

UNITED STATES PATENT AND TRADEMARK OFFICE
CERTIFICATE OF CORRECTION

| | | |
|---|---|---|
| PATENT NO. | : 8,244,639 B2 | Page 1 of 1 |
| APPLICATION NO. | : 10/795123 | |
| DATED | : August 14, 2012 | |
| INVENTOR(S) | : Levy | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1995 days.

Signed and Sealed this
Second Day of April, 2013

Teresa Stanek Rea
*Acting Director of the United States Patent and Trademark Office*